Aug. 2, 1927.

H. F. VENZKE 1,637,923

RADIO TUNING DEVICE

Filed Nov. 17, 1925  2 Sheets-Sheet 1

WITNESSES

INVENTOR
*Herbert F. Venzke*
BY
ATTORNEYS

Aug. 2, 1927.

H. F. VENZKE 1,637,923

RADIO TUNING DEVICE

Filed Nov. 17, 1925    2 Sheets-Sheet 2

WITNESSES

INVENTOR
Herbert F. Venzke
BY
ATTORNEYS

Patented Aug. 2, 1927.

1,637,923

UNITED STATES PATENT OFFICE

HERBERT F. VENZKE, OF BOYERTOWN, PENNSYLVANIA.

RADIO TUNING DEVICE.

Application filed November 17, 1925. Serial No. 69,713.

The object of the invention is to provide a tuning device in which the di-electric losses are reduced to a minimum; in which the distributed capacity is low; and in which the eddy current losses are considerably reduced; and in which the operating characteristics of the coil will remain uniform under any condition.

The invention is illustrated in the drawings, of which Figure 1 is a plan view of the tuning device.

Figure 1:
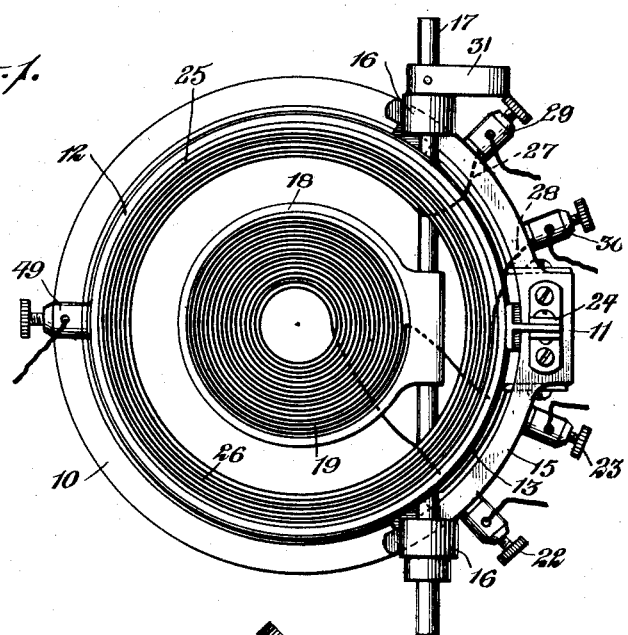
Figure 2:
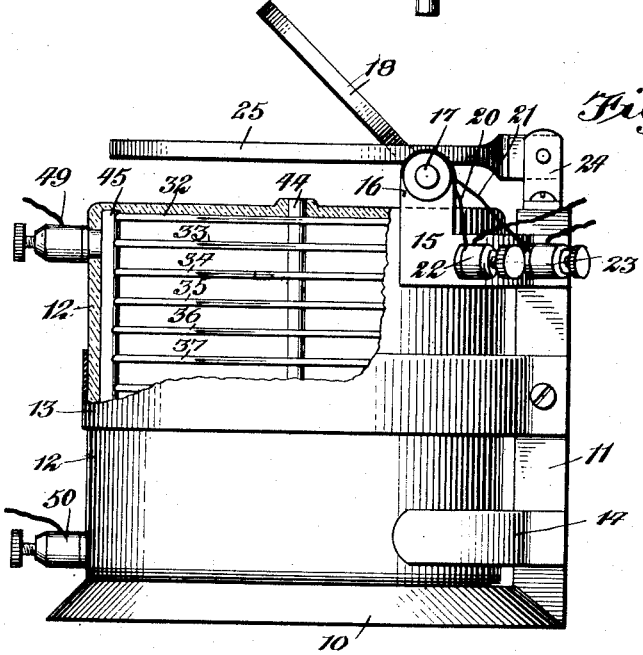
Figure 2 is a side elevation of the tuning device with a portion of the casing broken away.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention mainly concerns the provision of a new type of coil for a tuning device for use as a secondary coil. This coil is formed of tubular insulating material, preferably glass, and the conductive characteristics of the windings are produced by plating tubular material along desired portions. Preferably the coil is arranged in the form of a plurality of superposed flat spiral coils of suitable material, suitably plated, which are connected at their inner and outer ends by suitable supporting posts, preferably also of glass, and properly plated, as will hereinafter be described.

This coil, preferably a secondary coil of plated tubular material, is generally enclosed in an air-tight casing and then can be inductively related with respect to a primary and tickler coil as hereinafter described and shown.

In the preferred form of the invention I employ a base 10 having a vertical standard 11 at one side thereof. Suitably disposed on the base is a casing 12 of preferably insulating material such as glass which is airtight or can be a vacuum or filled with any desired gases. This casing may be held in position on the base by a ring 13 surrounding the casing and fastened to the standard 11, and by suitable arc-shaped brackets 14 and 15 lying partly around the casing and connected to the standard 11. The bracket 15 has vertically extending flange portions 16 on its opposite ends, suitably apertured to act as bearing portions for a shaft 17 on which is mounted a plate 18, preferably of insulating material, and on this plate is disposed in any desired fashion a tickler coil 19 preferably of the pancake type, from which wires 20 and 21 extend to binding posts 22 and 23 mounted on the bracket 15. The standard 11 has on its top a bracket member 24 acting as a pivot element for a plate 25 on which a primary winding 26 is disposed in any suitable manner. Wires 27 and 28 extend from the primary to binding posts 29 and 30 and mounted on the bracket member 15. The shaft 17 may be provided with a counterweight 31 (see Figure 1). It will be obvious that the primary and tickler windings can be adjusted to any desired extent with respect to a secondary winding or coil thus disposed within the casing 12.

Figure 3:
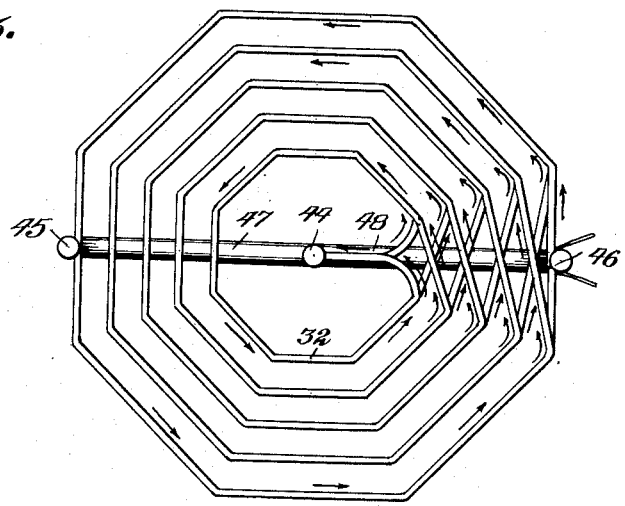
Figure 3 is a plan view of the secondary coil of the tuning device.
Figure 4:
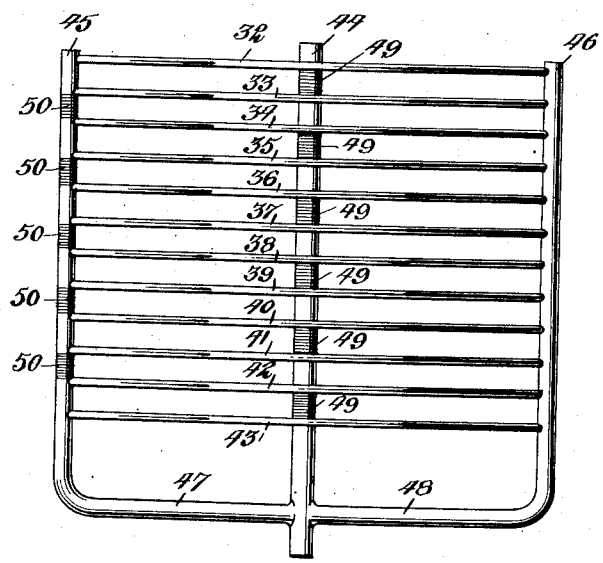
Figure 4 is a side view of the secondary coil.
Figure 5:
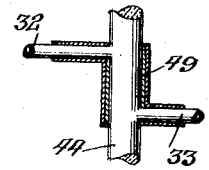
Figure 5 is a partial detail of the construction of the secondary coil.

Referring to Figures 3 and 4 particularly, the secondary winding or coil is formed of a plurality of superposed, spiral-shaped tubular elements such as 32 to 43 inclusive, preferably made of glass tubing. These coils or windings are all plated by any suitable method and preferably with copper, silver or gold.

The inner ends of each of these spiral coils or windings is fused to a central post 44, also preferably of glass. The outer edges of each of these windings at opposite points on the windings are also fused to vertical posts 45 and 46, preferably of glass. These three vertical posts 44, 45 and 46 are connected by horizontal crossbars 47 and 48, preferably of glass. In other words the windings are fused to a supporting framework which is U-shaped and having a central, vertical auxiliary limb. In Figure 4 there will be noticed a plurality of fine lines such as 49 and 50 on the central post 44 and on one of the vertical posts, 45. These lines represent plated portions of these respective posts which provide conductive paths between the inner and outer ends of the windings. It will be noted from Figure 4 that the inner ends of the windings 32 and 33 are connected together by a conductive plated portion on post 44. It will be noted that the outer ends of windings 33 and 34 are connected together by the plated portion 50 on the post 45. It will be noted that the inner ends of the windings 34 and 35 are connected together by a plated portion at post 44. It will be noted that the outer ends of the windings 35 and 36 are connected together by a plated portion on the post 45—and so on. In other words, the alternate pairs of windings are connected together by a conductive portion on one post and the outer ends of alternate pairs of windings are connected together by conductive portions on another post. In this way the various windings are connected up in series to form a continuous coil of as many pairs as is desired. By making the coil of tubular material and plating it I provide a winding which has the advantages above enumerated which is simple and compact. This winding is then placed within the casing 12 in the manner shown in the other figures. The binding post 49 is connected to the outside of the top winding 32 and a binding post 50 is connected to the outside of the bottom winding 43, these binding posts receiving wires connecting the secondary coil to any desired portion of a radio circuit.

What I claim is:

1. In a tuning device for a radio, a winding, said winding comprising a body portion of insulating material having a conductive coating thereon to carry the current.

2. In a tuning device for a radio, a winding which comprises a body portion of insulating material provided with a conductive coating to carry the current.

3. In a tuning device for a radio, a winding, said winding comprising a flat, spiral of insulating material provided with a conductive coating.

4. In a tuning device for a radio, a winding, said winding comprising a flat spiral of insulating material provided with a plated conductive coating thereon.

5. In a tuning device for radio, a winding, said winding comprising a flat spiral of glass having a conductive coating plated thereon.

6. In a tuning device for radio, a plurality of windings, which windings are formed of a curved length of insulating material coated with a conductive layer, connecting elements of insulating material connecting the respective ends of the windings, said connecting elements being coated with conductive material between alternate pairs of ends of the windings to provide a continuous path for the current from one end of the first winding to the other end of the last winding of the series.

7. In a radio tuning device, a plurality of super-posed windings which are each in flat, spiral form, each winding formed of insulating material, coated with a conductive layer, a connecting bar of insulating material connected to the inner ends of each winding and a connecting bar of insulating material connected to the outer ends of the windings, the connecting bars being coated with conductive material between the ends of alternate pairs of windings to provide a continuous path of current through the series of windings.

HERBERT F. VENZKE.